United States Patent
Wilhelm et al.

(10) Patent No.: US 10,440,883 B2
(45) Date of Patent: Oct. 15, 2019

(54) MOWER WITH CUTTER BAR CONTAINING ROTARY DISKS WITH CUTTERS

(71) Applicant: KUHN S.A., Saverne (FR)

(72) Inventors: Joel Wilhelm, Saint-Louis (FR); Michel Wolff, Waltenheim sur Zorn (FR); Bernard Wattron, Haegen (FR)

(73) Assignee: KUHN S.A., Saverne (FR)

( * ) Notice: Subject to any disclaimer, the term of this patent is extended or adjusted under 35 U.S.C. 154(b) by 213 days.

(21) Appl. No.: 15/609,537

(22) Filed: May 31, 2017

(65) Prior Publication Data

US 2017/0347524 A1     Dec. 7, 2017

(30) Foreign Application Priority Data

Jun. 1, 2016     (FR) ...................................... 16 70280

(51) Int. Cl.
    *A01D 34/66*     (2006.01)

(52) U.S. Cl.
    CPC ................................. *A01D 34/664* (2013.01)

(58) Field of Classification Search
    CPC ... A01D 34/664; A01D 34/665; A01D 34/668
    See application file for complete search history.

(56) References Cited

U.S. PATENT DOCUMENTS

| | | | | |
|---|---|---|---|---|
| 3,604,185 A | * | 9/1971 | Reber | A01D 34/76 56/12.7 |
| 4,183,196 A | * | 1/1980 | Oosterling | A01D 34/664 56/13.6 |
| 4,426,828 A | * | 1/1984 | Neuerburg | A01D 34/664 56/13.6 |
| 4,468,916 A | * | 9/1984 | Vissers | A01D 34/664 56/13.6 |
| 4,497,161 A | * | 2/1985 | Vissers | A01D 34/828 56/13.6 |

(Continued)

FOREIGN PATENT DOCUMENTS

| | | |
|---|---|---|
| DE | 10 2011 016 284 A1 | 10/2012 |
| EP | 0 552 610 A1 | 7/1993 |

(Continued)

OTHER PUBLICATIONS

French Preliminary Search Report dated Jan. 11, 2017 is French Application 16 70280 filed on Jun. 1, 2016 (with English Translation of Categories of Cited Documents and Written Opinion).

*Primary Examiner* — Arpad Fabian-Kovacs
(74) *Attorney, Agent, or Firm* — Oblon, McClelland, Maier & Neustdt, L.L.P.

(57) ABSTRACT

A mower with a cutter bar including an elongated hollow casing, at least one bearing block mounted at the level of an orifice of the upper wall of the casing, at least one disk integral with a support shaft mounted in the bearing block, at least one cutter fixed with the ability to rotate freely on the disk, wherein each bearing block is made integral with the casing by at least one fastener assembly composed of at least two fastening elements assembled mutually by screwing. The mower wherein, for each fastener assembly, at least part of the zone or zones of engagement of the respectively female-threaded and male-threaded parts of the fastening elements is situated between the respective mutually opposite bracing surfaces of the fastening elements. Thus the fastening elements are less protruding and their connection zones are not subjected to the aggressions of the outside environment.

15 Claims, 6 Drawing Sheets

(56) References Cited

U.S. PATENT DOCUMENTS

| | | | | |
|---|---|---|---|---|
| 4,633,656 A * | 1/1987 | Willinger | A01D 34/664 | 56/13.6 |
| 4,693,061 A * | 9/1987 | Koch | A01D 34/664 | 56/13.6 |
| 4,720,964 A * | 1/1988 | Ermacora | A01D 34/664 | 384/540 |
| 4,761,940 A * | 8/1988 | Wolff | A01D 34/664 | 56/13.6 |
| 4,815,262 A * | 3/1989 | Koch | A01D 34/664 | 56/13.6 |
| 4,838,014 A * | 6/1989 | Koch | A01D 34/664 | 56/13.6 |
| 4,887,416 A * | 12/1989 | Crane | A01D 34/664 | 56/13.6 |
| 4,888,939 A * | 12/1989 | Crane | A01D 34/664 | 56/13.6 |
| 4,890,445 A * | 1/1990 | Crane | A01D 34/664 | 56/13.6 |
| 4,986,060 A * | 1/1991 | Walters | A01D 34/664 | 56/13.6 |
| 5,012,635 A * | 5/1991 | Walters | A01D 34/665 | 56/13.6 |
| 5,212,936 A * | 5/1993 | Lauritsen | A01D 34/664 | 56/13.6 |
| 5,715,662 A * | 2/1998 | Walters | A01D 34/664 | 464/32 |
| 5,875,619 A * | 3/1999 | McLean | A01D 34/665 | 56/13.6 |
| 5,937,624 A * | 8/1999 | McLean | A01D 34/665 | 56/13.6 |
| 7,536,846 B1 * | 5/2009 | Pruitt | A01D 34/664 | 56/13.6 |
| 7,661,253 B2 * | 2/2010 | Pruitt | A01D 34/665 | 56/13.6 |
| 8,020,363 B1 * | 9/2011 | Barnett | A01D 34/665 | 56/17.4 |
| 2003/0136218 A1 * | 7/2003 | Wohlford | A01D 34/664 | 74/606 R |
| 2005/0229574 A1 | 10/2005 | Walter et al. | | |
| 2008/0168758 A1 * | 7/2008 | Walter | A01D 34/664 | 56/320.1 |
| 2018/0206407 A1 * | 7/2018 | Havers | A01D 34/664 | |

FOREIGN PATENT DOCUMENTS

| | | |
|---|---|---|
| EP | 2 508 061 A1 | 10/2012 |
| FR | 2 840 765 A1 | 12/2003 |

* cited by examiner

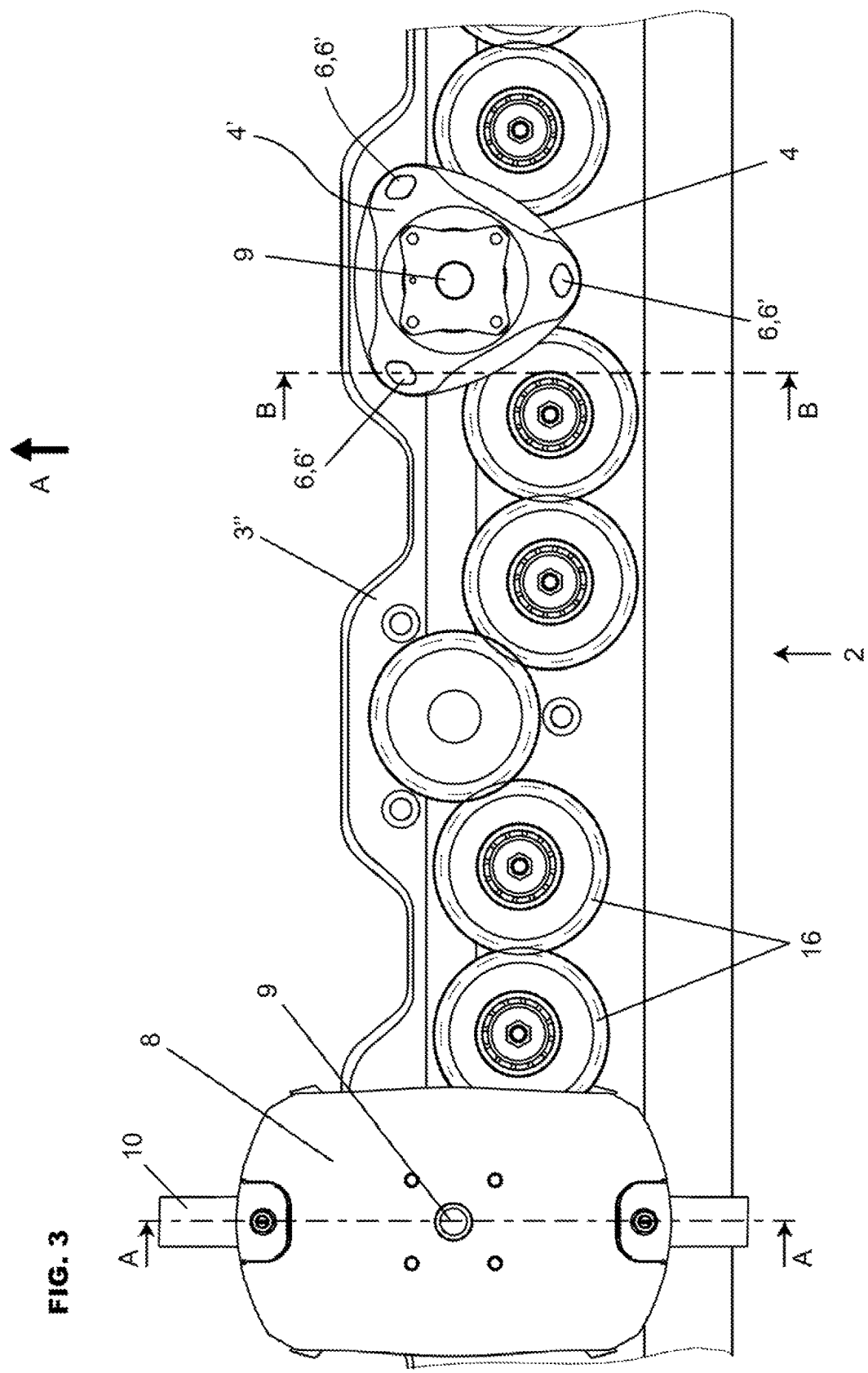

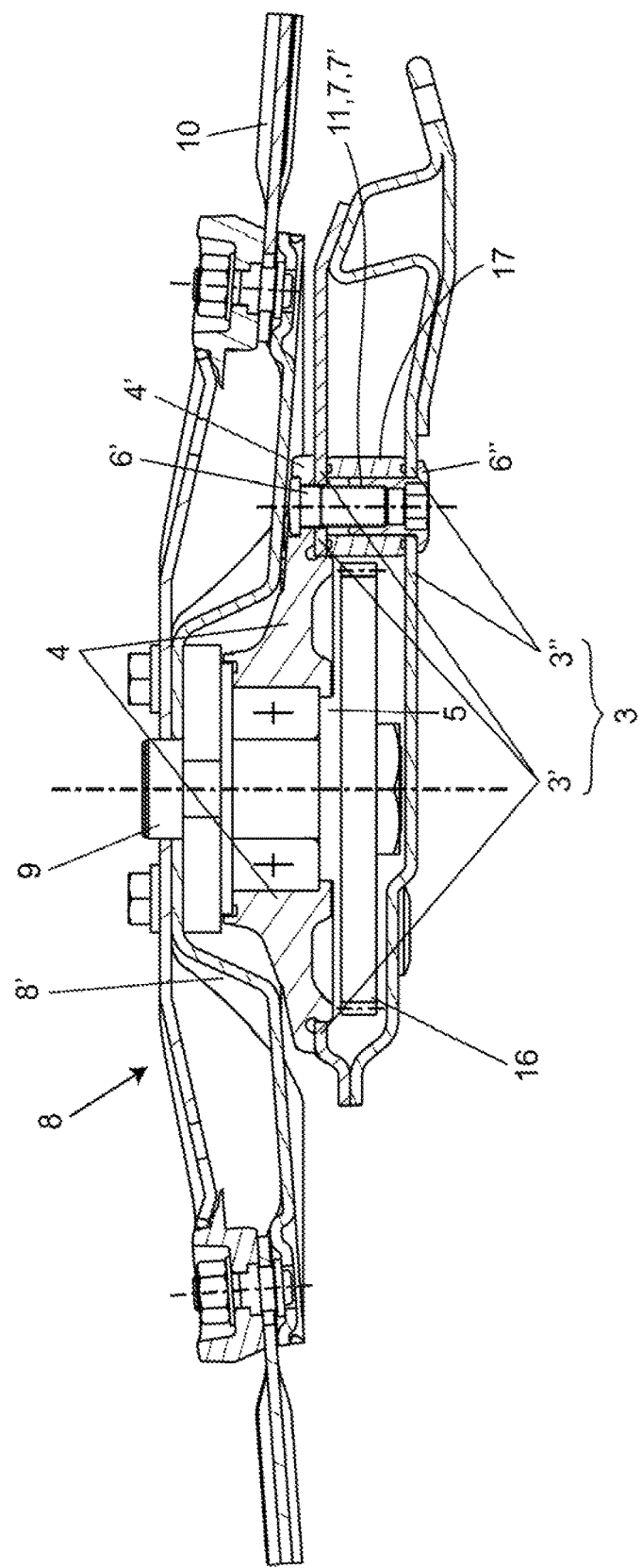

MOWER WITH CUTTER BAR CONTAINING ROTARY DISKS WITH CUTTERS

BACKGROUND

The present invention relates to the field of agricultural machinery, more particularly to mowing equipment and machines, especially those designed to be mounted on the rear or front of a tractor, and its object is a mower comprising at least one cutter bar provided with rotary disks with cutters.

Numerous embodiments of mowers of this type are already known in the prior art, in particular from the documents DE 10 2011 016 284 and EP 2 508 061.

In general, the mowing or cutter bars of these mowers comprise:
- an elongated hollow casing with an upper wall and a lower wall,
- at least one bearing block mounted at the level of an orifice of the upper wall of the casing,
- at least one disk integral with a driven support shaft, which is mounted to be guided in rotation in the said bearing block,
- at least one cutter, with a radial and freely rotating protrusion, fixed on the said disk, wherein the bearing block or each bearing block is integral with the casing by screw-type fastening means or at least partial cooperation of a male thread and a female thread.

The support shaft is rigidly assembled in the upper part, outside the casing, with the disk carrying the cutters, and it is integral in the lower part and inside the casing with a toothed pinion or wheel engaging with an element of a gear train driven by the power take-off of the tractor, wherein the bearing block integrates a ball bearing or needle bearing to facilitate rotation of the said shaft.

The cutters in turn are mounted at the level of the ends of fastening strips assembled rigidly on the disk.

In the embodiments of the aforesaid DE and EP documents, the bearing blocks are of modest size, mounted in orifices of small dimension and integral only with the upper wall of the casing.

Such a construction has several major disadvantages.

A bearing block of modest size intrinsically has limited resistance to stresses and impacts. Furthermore, its fastening on the upper wall alone constitutes an additional limitative factor in terms of rigidity and strength of the construction, wherein transmission of forces to the casing are additionally concentrated locally.

Finally, since the opening of the casing receiving the bearing block is also of small size, demounting for the purpose of replacing certain toothed pinions and wheels mounted in the casing makes it necessary to separate the two walls and open the said casing.

As an alternative, under-dimensioning of the said toothed pinions and wheels may be provided, but this entails more complex kinematic chains with more elements.

In addition, in these embodiments, the bearing block is fixed on the upper wall by visible fastening means, which project relative to the casing and are exposed to the outside atmosphere.

Consequently, earth and other debris cluster around these projecting parts, causing alteration of these parts due in particular to the impacts of stones. Such alteration may make it difficult or even impossible to demount the bearing block. In addition, the accumulation of debris may lead to resistance to movement and to greater wear of mobile parts due to friction.

The cutter bar of the Applicant's mower known by the name "OPTIDISC" (registered trademark) and represented in section in FIG. 1 makes it possible to remedy at least some of the aforesaid disadvantages. The same is true for the cutter bar known from document FR 2 840 765 of the Applicant.

In fact, in these cutter bars, the bearing block is of clearly larger dimension and is integrated solidly with both walls by fastener assemblies, each composed of two elements mutually assembled by screwing, wherein stiffening spacers prevent crushing of the casing during tightening and ensure a good distribution of stresses.

In addition, the mounting orifice of the bearing block makes passage of all toothed pinions and wheels easy.

Nevertheless, the fastener assemblies employed in the aforesaid known embodiments of the Applicant comprise nuts and bolts, the threads and screwing zones of which also project beyond the corresponding bearing block and are therefore exposed, as mentioned in the foregoing.

In addition, considering the radial size of the bearing block and therefore the radial spacing of the protruding assemblies of nuts and bolts, these projecting elements prevent the cutters from performing a complete rotation around their axis (these cutters are situated as close as possible to the upper face of the casing). This implies additional wear of the cutter during collisions with obstacles: in fact, after having struck an obstacle, the cutter rebounds from the obstacle then rotates in the opposite direction, sometimes at high speed.

To ensure that they do not damage the mounting strip (a part that is difficult to replace), specific stops must be provided in order to permit damping of the return movement of the cutter when it has encountered an obstacle.

This therefore culminates in a more complex construction and faster wear of the cutters.

Finally, and most importantly, the cutters are unable to execute a rotation of 360°, meaning that they cannot rotate freely.

BRIEF SUMMARY

The object of the present invention is to improve the aforesaid mower of the Applicant with a view to avoiding any projecting exposure of the functional parts of the fastener assemblies of the bearing block or bearing blocks and to permit rotation of the cutter or cutters by 360°.

To this end, the object of the invention is a mower with at least one cutter bar comprising:
- an elongated hollow casing with an upper wall and a lower wall,
- at least one disk integral with a support shaft,
- at least one cutter, with radial protrusion and the ability to rotate freely, fixed on the said disk,
- at least one bearing block mounted at the level of an orifice of the upper wall of the casing, and receiving the said support shaft, in a manner guided in rotation,
- wherein the bearing block or each bearing block is made integral with the casing by at least one fastener assembly composed of at least two fastening elements assembled by screwing, directly or indirectly, the mower being characterized in that, for at least one of the fastener assemblies of the or each bearing block, at least part, preferably substantially the entirety of the zone or zones of engagement or of mutual gripping of female-threaded or male-threaded parts of the fastening elements is situated between the respective bracing surfaces of the said at least two fastening elements.

BRIEF DESCRIPTION OF THE DRAWINGS

The invention will be better understood by virtue of the description hereinafter, which relates to a preferred embodiment, provided by way of non-limitative example, and will be explained with reference to the attached schematic drawings, wherein:

FIG. 3 is an overhead and partial cutaway view (wherein certain disks and bearing blocks as well as the upper wall are demounted) of one part of a mower cutter bar according to one embodiment of the invention;

FIGS. 4A and 4B are sectional views of a cutter bar according to the invention, respectively in section planes A-A (passing through a rear fastener assembly and the bearing block axis) and B-B (passing through a front fastener assembly) as indicated in FIG. 3, according to a particular alternative embodiment of the fastener assemblies of the support bearing blocks of the rotary disks.

DETAILED DESCRIPTION

Figure 1:
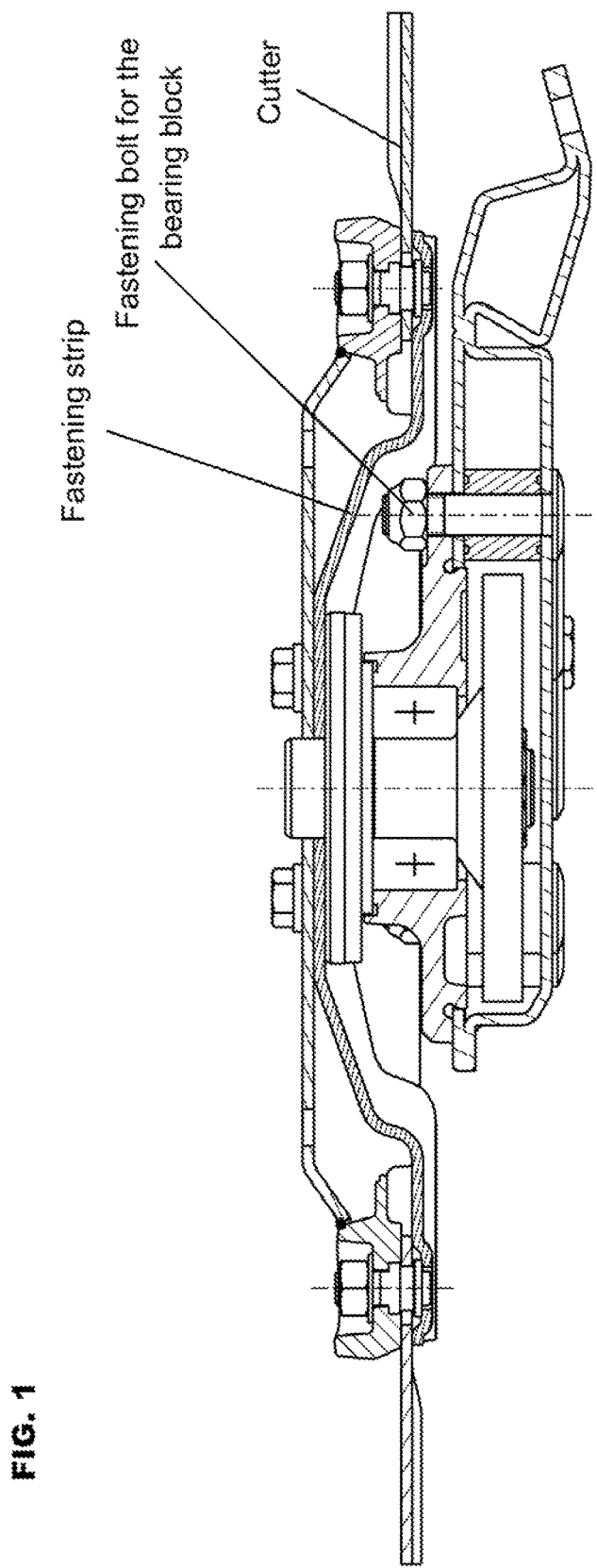
FIG. 1 is a sectional view of a cutter bar.
Figure 2:
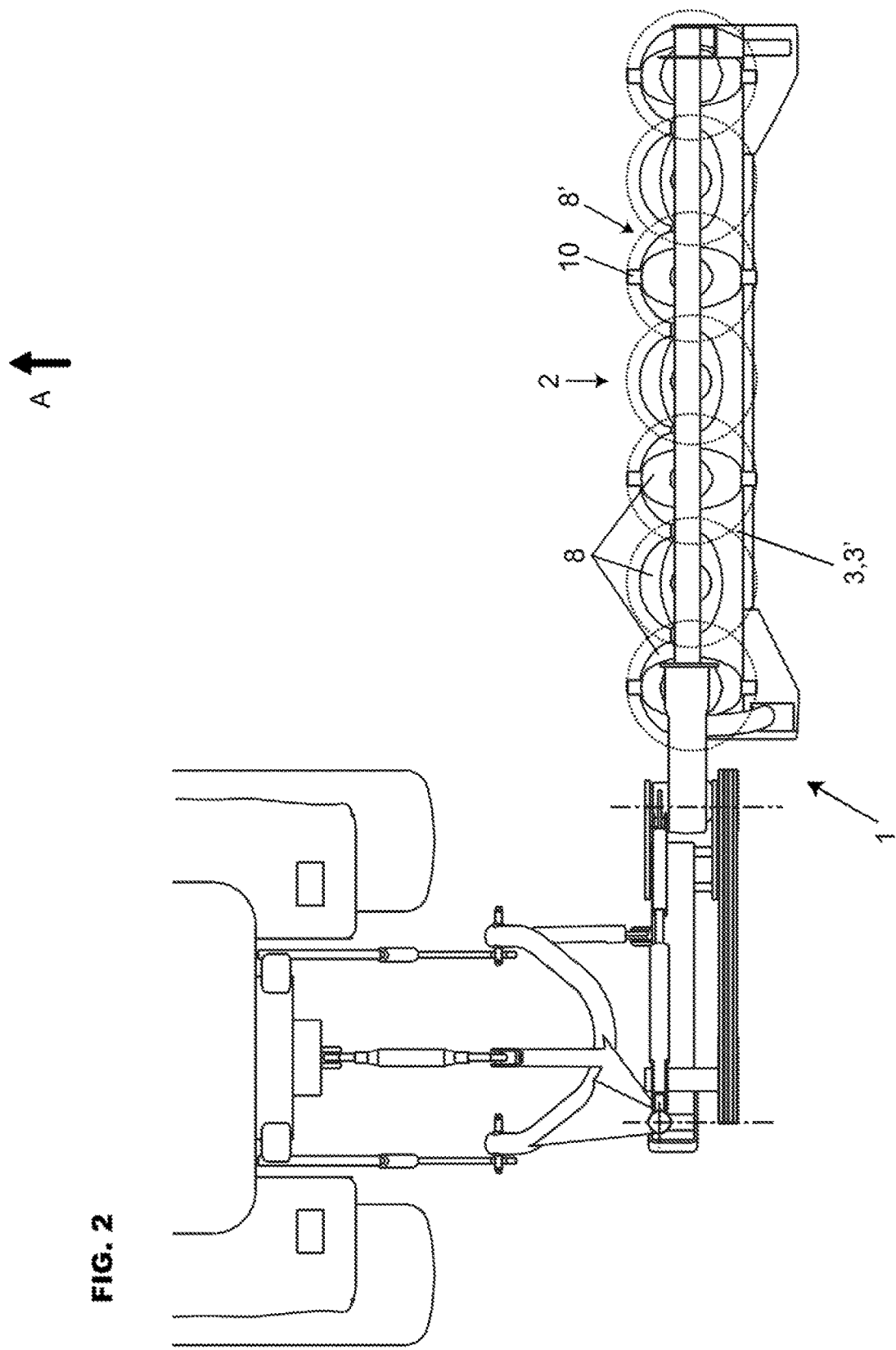
FIG. 2 is an overhead view of a mower according to the invention mounted on a hitch system of a tractor.
Figure 4B:
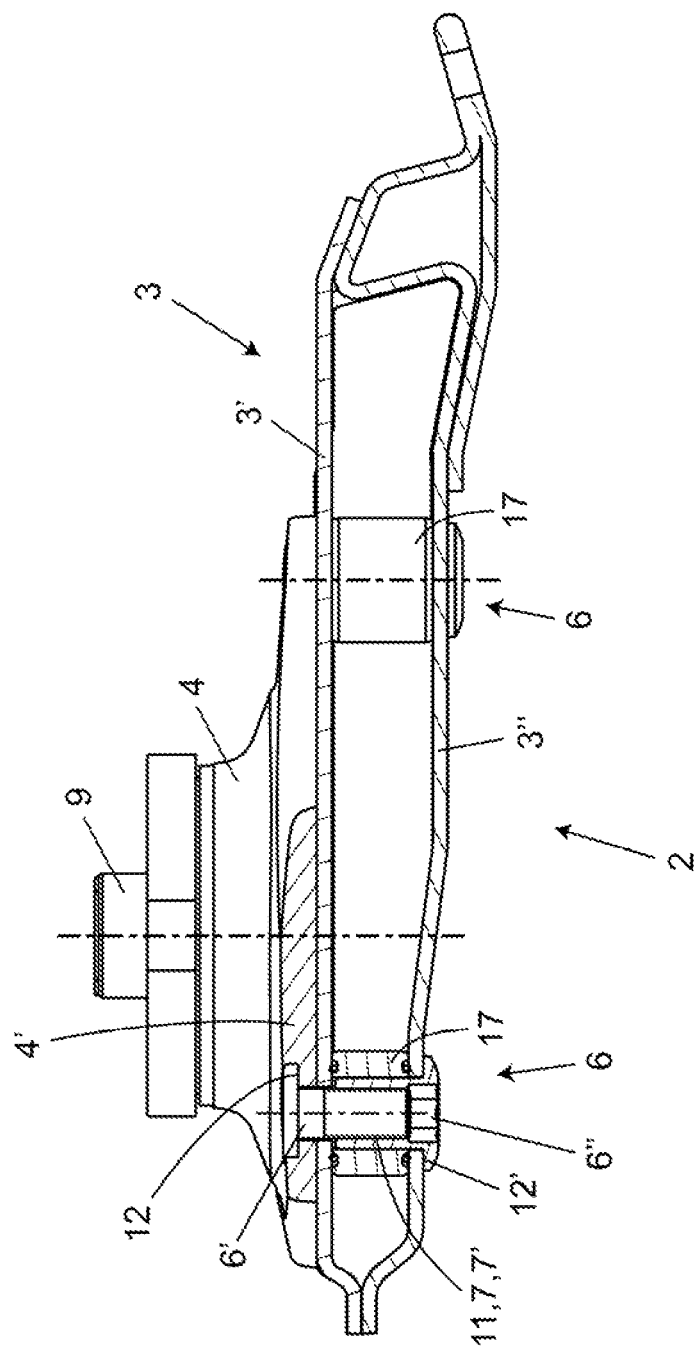

FIG. 2 and to some extent FIGS. 3, 4A and 4B show a mower 1 with at least one cutter bar 2 comprising:
- an elongated hollow casing 3 with an upper wall 3' and a lower wall 3",
- at least one disk 8 integral with a support shaft 9,
- at least one cutter 10, with radial protrusion and the ability to rotate freely, fixed on the said disk 8,
- at least one bearing block 4 mounted at the level of an orifice 5 of upper wall 3' of casing 3, and receiving the said support shaft, 9 in a manner guided in rotation,
wherein the or each bearing block 4 is made integral with the casing 3 by at least one fastener assembly 6 composed of at least two fastening elements 6', 6" assembled by screwing, directly or indirectly.

According to the invention, it is provided that, for at least one of the fastener assemblies 6 of the or each bearing block 4, at least part, preferably substantially the entirety of the zone or zones 11 of engagement or of mutual gripping of female-threaded 7' and male-threaded 7 part(s) respectively of fastening elements 6', 6" is situated between the respective bracing surfaces 12 and 12' of the said at least two fastening elements 6', 6".

Thus, by virtue of the invention, the sensitive zone or zones of engagement and of connection by screwing of constitutive components 6', 6" of each fastener assembly 6 is or are not subject to exposure to aggressions of the outside environment and is or are protected by casing 3 and/or bearing block 4. In addition, such a construction also makes it possible to reduce the degree of protrusion of fastening elements 6', 6" relative to their respective bracing surfaces 12 and 12'.

As illustrated in FIGS. 4A to 9 by way of examples, for each fastener assembly a first bracing surface 12, associated with a first fastening element 6', is situated at the level of bearing block 4 in question or of upper wall 3' of casing 3, and a second bracing surface 12', associated with a second fastening element 6", is situated at the level of lower wall 3" of casing 3, to be assembled with the two opposite walls 3' and 3" of casing 3.

Bracing zone 12, 12' of the said at least two fastening elements 6', 6" will be understood herein as the surface on which the pressure exerted by fastening element 6', 6" under consideration is applied during tightening of fastener assembly 6.

In the alternative embodiments represented in FIGS. 4A to 9, these bracing surfaces 12, 12' are situated at the level of one of walls 3', 3" or of bearing block 4.

Nevertheless, in case of employment of intermediate or additional spacers, such as washers, for example, the said bracing surfaces 12, 12' are situated at the level of the faces of the said additional pieces in contact with fastening elements 6', 6".

Engagement zone 11 will be understood herein as male-threaded 7 and female-threaded 7' zones, which cooperate mutually by screwing and provide a connecting function.

The person skilled in the art understands that the number of fastener assemblies 6 employed may vary, depending on the nature of the integrality and of the design of the assembly between a bearing block 4 and casing 3.

In fact, according to one embodiment, not shown, bearing block 4 and casing 3 may be designed to be assembled or preassembled by nesting or mechanical cooperation of complementary sites (for example, a bayonet or locking assembly), in such a way that a single fastener assembly 6 may then be sufficient to lock or block such a mechanical assembly or preassembly.

Nevertheless, according to the invention, it is recommended that at least two fastener assemblies 6 be used, preferably as shown in FIG. 3, at least three, and optimally exactly three (best compromise between efficiency and cost). Although uniformity of the embodiments of integrality of the different bearing blocks 4 would be preferred, constructively different integrality (for example in terms of number and positioning of assemblies 6) may be envisioned, wherein each of these assemblies may or may not have one or more of the arrangements recommended by the invention.

In addition, in terms of variants of practical embodiments, numerous options may be provided for each fastener assembly 6. In the case of the presence of a plurality of fastener assemblies 6 for integrality of the different bearing blocks 4 with walls 3' and 3" of the casing, assemblies 6 of different constructions may be envisioned.

By way of examples, FIGS. 4A to 9 illustrate several alternative embodiments of such a fastener assembly 6 according to the invention.

Preferably, assembly 6 is constituted of two cooperating fastening elements 6' and 6" (FIGS. 4A, 4B, 5, 6, 8 and 9).

According to a first variant, which is evident in FIGS. 4A, 4B, 6, 8 and 9, at least one and preferably each fastener assembly 6 is constituted by two separate pieces, in other words by a screw 6' and by a female-threaded sleeve nut 6", which form the two cooperating fastening elements of this assembly: the fastener assembly is then constituted by a first fastening element 6' in the form of a screw and a second fastening element 6" in the form of a female-threaded sleeve nut.

Figure 6:
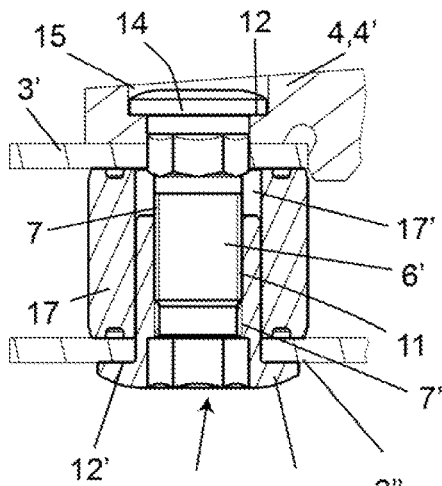
Figure 8:
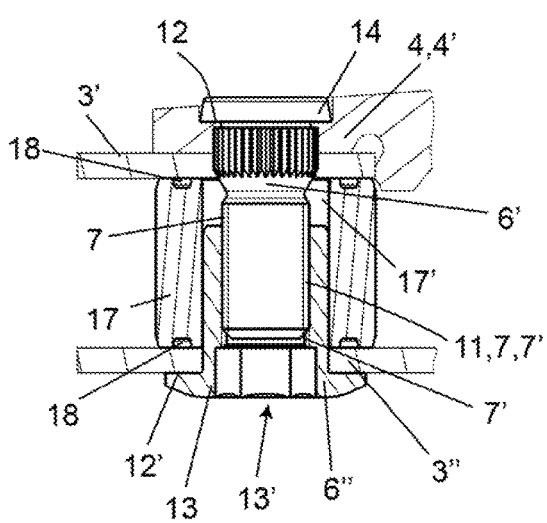
Figure 9:
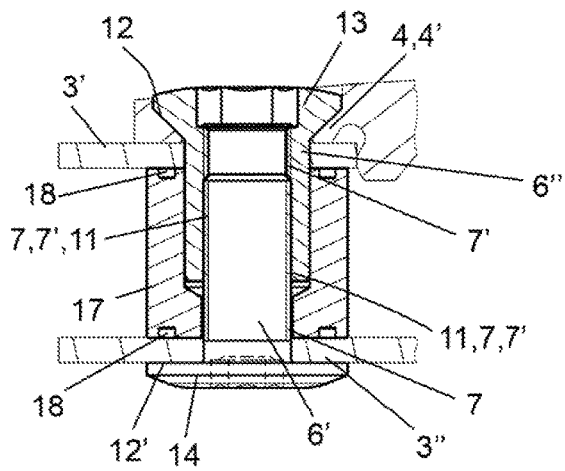

As shown by way of example in FIGS. 6, 8 and 9 in particular, sleeve nut 6" consists advantageously of a female-threaded bush equipped with a head 13 or a collar that becomes braced on a corresponding surface 12, 12' of one of walls 3', 3" or of bearing block 4.

Screw 6' and nut 6" may constitute, indifferently and as shown in the aforesaid figures, on the one hand an upper fastening element (braced on 4 or on 3') and on the other hand the lower fastening element (braced on 3"), or vice versa.

Figure 5:
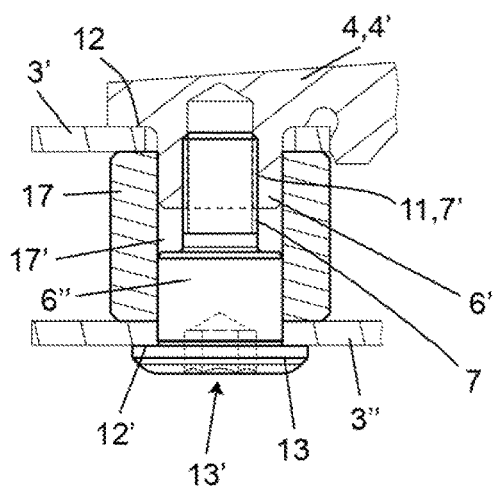
FIGS. 5 to 9 are detail views in section illustrating other constructive variants of fastener assembly according to the invention for a support bearing block.

According to a second variant illustrated in FIG. 5, it may be provided that, for at least one or possibly each fastener assembly 6, fastening element 6' braced on upper wall 3' of casing 3 is integrated structurally with bearing block 4 in question, advantageously by being formed in one piece with a bracing tab or collar 4' of this bearing block 4, and is provided with a blind orifice having a female-threaded part 7'. It will be noted in this FIG. 5 that bracing tab or collar 4' of bearing block 4 containing this female-threaded orifice 7' is advantageously prolonged to form a blind female-threaded sleeve 6' that penetrates into casing 3 via an opening in upper wall 3', in which it is received in wedged manner.

In this variant, fastener assembly 6 has only one separate piece 6" in the form of a screw, and bracing surface 12 associated with integrated fastening element 6' corresponds to that of tab or collar 4' on upper wall 3'.

Collar 4' is defined as being the surface of bearing block 4 braced on the casing or the piece on which it is assembled.

Figure 7:
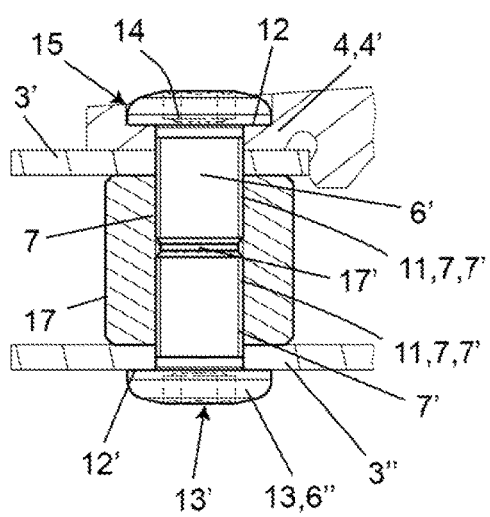

Finally, and in conformity with a third alternative embodiment illustrated by way of example in FIG. 7, at least one and possibly each fastener assembly 6 is constituted by three cooperating fastening elements 6', 6", 17, in other words, on the one hand first and a second male-threaded fastening element 6' and 6", which respectively become braced on bearing block 4 in question and on lower wall 3" of casing 3, and on the other hand a third, female-threaded fastening element 17 cooperating by screwing with each of the said first and second fastening elements 6' and 6" to establish a rigid connection between them.

This intermediate connecting element 17 preferably has female-threaded zones extending at least over the entirety of the possible engagement zones 11 of first and second fastening elements 6', 6".

Both screws 6' and 6", which are preferably identical, advantageously have dimensions such that they engage on both sides over a maximum depth, almost coming into mutual contact (FIG. 7), while third fastening element 17 is advantageously female-threaded over its entire axial length.

In order to facilitate the assembly of fastening elements 6' and 6" by screwing, one of them may be blocked in rotation in the mounted state, preferably fastening element 6' braced on bearing block 4 in question.

This blocking in rotation may result from cooperation between the shapes of the head of element 6' and the corresponding receiving site 15 of bearing block 4 or of upper wall 3' of the casing. Thus, as FIG. 6 shows, it is possible to provide complementary hexagonal shapes of head 14 of element 6' and of the opening in upper wall 3', or else flutes at the level of head 14 of element 6' and forced assembly with deformation of the rims of the opening of upper wall 3' through which element 6 passes.

If no constructive blocking is provided for one of fastening elements 6' and 6", they may be provided with sockets 13' for engagement of keys or driver bits.

In any case, and as shown in FIGS. 4A to 9, at least fastening element 6" braced on the outer face of lower wall 3" of casing 3 is provided with a head 13 having a socket 13' appropriate for engagement with a tool, preferably a cross-recessed socket 13' in a flat head 13. This socket 13' permits fastening element 6', 6" in question to be turned or blocked in rotation.

Similarly, it is advantageously provided, according to the invention, that upper fastening element 6' is configured and mounted in such a way that it is substantially non-projecting and non-protruding relative to its mounting environment.

To this end, when upper fastening element 6' is not a directly integral part of bearing block 4 (FIG. 7), head 14 of this element 6' braced on bearing block 4 in question is received in a recess 15 of a bracing collar 4' or of a part of a mounting collar of the said bearing block 4, in substantially flush or countersunk manner (FIGS. 4A, 4B, and 6 to 9).

By virtue of this arrangement, fastener assemblies 6 are completely retracted and no longer constitute an obstacle to free rotation of cutters 10 by 360°.

Advantageously, and as shown in FIG. 3, each bearing block 4 is fixed on the casing by way of at least three fastener assemblies 6. In addition, bearing blocks 4 are advantageously provided with a collar 4' of triangular shape, especially for optimization of the ratio between rigidity and quantity of material.

FIGS. 3, 4A and 4B illustrate other advantageous constructive characteristics of the invention.

Thus a strip 8' for mounting cutters 10 may be rigidly integrated with the or each disk 8, wherein these strips 8' have a conformation that locally substantially matches the outer shape of the corresponding bearing block 4, with sufficient clearance to permit complete rotation of the said cutters 10 around their respective mounting axes.

In addition, the invention advantageously provides that each orifice 5 machined in upper wall 3' of casing 3, traversed by a driven support shaft 9, and at the level of which a bearing block 4 for guidance in rotation is mounted, has an opening of sufficient dimension for passage of each of the different gear elements 16 housed in casing 3 and assuring rotational drive of support shafts 9.

This orifice 5 is advantageously sealed by the said bearing block 4, which is provided with discoidal radial structure constituting a mounting and fastening collar 4' braced on upper wall 3' of casing 3 (around opening 5) and having bracing surfaces 12 for the fastening elements 6 in question.

To structurally reinforce the hollow member that forms casing 3 and to stiffen it while providing specific protection for the female-threaded/male-threaded parts of the cooperating fastening elements 6' and 6", cutter bar 2 may be provided, at the level of each fastener assembly 6, with a tubular spacer 17 extending between upper 3' and lower 3" walls of casing 3 and receiving, in its traversing passage 17', at least one of the fastening elements 6' and 6" forming assembly 6 in question, preferably at least zone 11 of engagement or mutual gripping of parts 7, 7', which are connected by screwing, of these two fastening elements 6' and 6".

When fastener assembly 6 comprises three elements 6', 6" and 17 as represented in FIG. 7 and as in the foregoing, it may be provided that spacer 17 has a female thread 7' in which engagement by screwing takes place of male-threaded parts 7 of first and second fastening elements 6' and 6", which have the form of screws, which may or may not be identical, and advantageously have a maximum depth of engagement. Spacer 17 then constitutes a female-threaded sleeve that simultaneously receives upper and lower fastening elements 6' and 6" by screwing.

According to another characteristic of the invention, each spacer 17 is mounted to be braced sealingly under pressure between lower 3" and upper 3' walls of casing 3, thus defining a receiving housing isolated from the outside environment (by means of compression seals 18, for example).

According to another characteristic, which is evident in FIGS. 4A and 4B, the invention may provide that spacers 17, relative to the forward direction A while mower 1 is in operation, are situated either in front of or behind driven support shafts 9, in which case the spacers situated in front of this shaft 9 have a smaller longitudinal dimension or height than the spacers situated behind this shaft 9.

Furthermore, FIG. 3 illustrates a preferred angular arrangement of three fastener assemblies 6 around the axis of bearing block 4 (the two assemblies 6 situated in front are aligned parallel to the longitudinal axis of cutter bar 2).

According to an additional characteristic, which is evident in particular in FIGS. 4A and 4B, it may be provided that upper 3' and lower 3" walls forming casing 3 by cooperation each consist of a one-piece member, advantageously produced by deep-drawing, wherein these walls 3' and 3" are preferably assembled by peripheral welding at the level of mutually coinciding assembly collars.

As is shown in particular in FIGS. 4A and 4B, casing 3 may advantageously have a constitution similar to that described in the French patent application filed today by the Applicant and relating to a mower cutter bar with disks.

Of course, the invention is not limited to the embodiments described and represented in the attached drawings. Modifications are still possible especially from the viewpoint of the constitution of the various elements or by substitution of equivalent techniques, without departing from the scope of protection of the invention.

The invention claimed is:

1. A mower with at least one cutter bar comprising:
   an elongated hollow casing with an upper wall including a top planar face and a lower wall including a bottom planar face that faces an opposite direction from the top planar face of the upper wall,
   at least one disk integral with a support shaft,
   at least one cutter, protruding radially from the support shaft and configured to rotate freely, fixed on said disk,
   at least one bearing block mounted at the level of an orifice of the upper wall of the casing, and receiving said support shaft, in a manner guided in rotation,
   wherein each bearing block is made integral with the casing by at least one fastener assembly comprising a first fastening element pressing the bearing block at a first bracing surface, a second fastening element pressing the bottom planar face of the lower wall of the casing at a second bracing surface, and a spacer positioned between the upper wall of the casing and the lower wall of the casing,
   wherein the bearing block presses the top planar face of the upper wall,
   wherein the first fastening element, the second fastening element, and the spacer are separate pieces from the upper wall of the casing and the lower wall of the casing,
   wherein the first fastening element, the second fastening element, and the spacer are assembled by screwing, directly or indirectly, and
   wherein, for at least one of the fastener assemblies of the bearing block, a zone or zones of engagement or of mutual gripping of female-threaded part(s) and male-threaded part(s) of the fastener assembly is situated between the first bracing surface of said first fastening element and the second bracing surface of the second bracing element.

2. The mower according to claim 1, wherein the first fastening element is a screw and the second fastening element a female-threaded sleeve nut.

3. The mower according to claim 1, wherein the first fastening element and the second threaded fastening element each include the male-threaded parts, and the spacer is a third, female-threaded fastening element cooperating by screwing with each of said first and second fastening elements to establish a rigid connection between them.

4. The mower according to claim 1, wherein one of the first and second fastening elements is blocked in rotation in the mounted state.

5. The mower according to claim 1, wherein at least the second fastening element braced on the bottom planar face of the lower wall of the casing is provided with a head having a socket appropriate for engagement with a cross-recessed socket in a flat head.

6. The mower according to claim 1, wherein the head of the first fastening element is braced on the bearing block by being received in a recess of a bracing collar or of a part of a mounting collar of said bearing block, in substantially flush or countersunk manner.

7. The mower according to claim 1, wherein each bearing block of the at least one bearing block is fixed on the casing by way of at least three fastener assemblies.

8. The mower according to claim 1, wherein a strip for mounting the at least one cutter is rigidly integrated with the disk, wherein the strip has a conformation that locally substantially matches an outer shape of the corresponding bearing block, with sufficient clearance to permit complete rotation of each cutter of said at least one cutter around a respective mounting axis.

9. The mower according to claim 1, wherein each orifice machined in the upper wall of the casing, traversed by a driven support shaft, and at the level of which a bearing block for guidance in rotation is mounted, has an opening, and wherein said orifice is sealed by said bearing block, which is provided with discoidal radial structure constituting a mounting and fastening collar braced on the upper wall of the casing and having bracing surfaces for the fastening elements.

10. The mower according to claim 1, wherein the spacer is tubular and extends between the upper and lower walls of the casing and at least the zone of engagement or mutual gripping of the fastening elements is located in a traverse passage of the tubular spacer.

11. The mower according to claim 10, wherein the tubular spacer has, on at least part of its inner face, a female thread, in which engagement by screwing takes place of the male-threaded parts of the first and second fastening elements, which have the form of screws, have a maximum depth of engagement.

12. The mower according to claim 10, wherein the tubular spacer is mounted to be braced sealingly under pressure between the lower and upper walls of the casing, thus defining a receiving housing isolated from the outside environment.

13. The mower according to claim 10, wherein, relative to a forward direction while the mower is in operation, the at least one fastener assembly of the bearing block includes a first fastener assembly situated in front of the support shaft and a second fastener assembly situated behind the driven support shaft, and the spacer of the first fastener assembly situated in front of the support shaft has a smaller longitudinal dimension or height than the spacer of the second fastener assembly situated behind the support shaft.

14. The mower according to claim 1, wherein the upper and lower walls forming the casing by cooperation each consist of a one-piece member.

15. A mower with at least one cutter bar comprising:
   an elongated hollow casing with an upper wall including a top planar face and a lower wall including a bottom planar face that faces an opposite direction from the top planar face of the upper wall, at least one disk integral with a support shaft, at least one cutter, protruding radially from the support shaft and configured to rotate freely, fixed on said disk, at least one bearing block mounted at the level of an orifice of the upper wall of the casing, and receiving said support shaft, in a manner guided in rotation, wherein each bearing block is made integral with the casing by at least one fastener assembly comprising a first fastening element, a second fastening element in direct contact with the bottom planar face of the lower wall of the casing at a second bracing surface, and a spacer positioned between the upper wall of the casing and the lower wall of the casing, wherein the bearing block directly contacts the top planar face of the upper wall, wherein the first fastening element, the second fastening element, and the spacer are separate pieces from the upper wall of the casing, the lower wall of the casing, wherein the first fastening element is integrated structurally with the bearing block by being formed in one piece with a bracing tab or collar of said bearing block, and is provided with a blind orifice having a female-threaded part, wherein the first fastening element, the second fastening element, and the spacer are assembled by screwing, directly or indirectly, and wherein, for at least one of the fastener assemblies of the bearing block, a zone or zones of engagement or of mutual gripping of female-threaded part(s) and male-threaded part(s) of the fastener assembly is situated between the first bracing surface of said first fastening element and the second bracing surface of the second bracing element.

* * * * *